No. 660,286. Patented Oct. 23, 1900.
M. J. BANNON.
DIE FOR MOLDING CLAY PIPES.
(Application filed Jan. 27, 1900.)

(No Model.) 2 Sheets—Sheet 1.

Witnesses
A. P. Lewbitz
Sophia Kurn

Inventor
Martin J. Bannon
By Attorney
Lewis N. Dembitz

No. 660,286. Patented Oct. 23, 1900.
M. J. BANNON.
DIE FOR MOLDING CLAY PIPES.
(Application filed Jan. 27, 1900.)

(No Model.) 2 Sheets—Sheet 2.

Witnesses
A. L. Hurlbut
Sophia Kern

Inventor
Martin J. Bannon
By Attorney
Lewis N. Dembitz

UNITED STATES PATENT OFFICE.

MARTIN J. BANNON, OF LOUISVILLE, KENTUCKY.

DIE FOR MOLDING CLAY PIPES.

SPECIFICATION forming part of Letters Patent No. 660,286, dated October 23, 1900.

Application filed January 27, 1900. Serial No. 2,935. (No model.)

*To all whom it may concern:*

Be it known that I, MARTIN J. BANNON, a citizen of the United States, and a resident of the city of Louisville, county of Jefferson, and State of Kentucky, have invented a new machine—namely, a Die for Casting Improved Clay Pipes—for the purposes hereinafter set forth, of which the following is a specification.

My invention for which I seek the protection of a patent is of importance only by reason of the improved clay pipe for enveloping steam or water pipes laid underground, which improved clay pipe is also invented by myself, but which is probably not patentable, because the novelty is only that doing in clay pipes what has often been done in iron pipes. Clay pipes have for some time been used to envelop steam or water pipes laid underground and are made in short sections, into which like sections of the steam or water pipe are inserted lengthwise. I propose to make the clay pipes in two semicircular segments, so that the lower segment having its proper rests can be laid down into the ground, the steam or water pipe put upon these rests, and lastly the upper segment put on top, the two segments being fitted with lips on both sides, so as to make a water-tight connection. The same thing is now done in the pillow-blocks for the ordinary gearing of engines, the pillow-block being in a sense a pipe within which a shaft turns, and it is made of two half-pipes fitted together with lips, so that the lower half can be laid down first. Then the shaft can be put in position and the upper half or segment put on last. I propose to make enveloping clay pipes for steam or water pipes on the same principle, so that each section in length can be separately repaired or replaced; but the making of clay pipes requires very different machinery from that of iron pipes and of clay pipes with lips to both sides of the two segments different machinery from any known before, and this I will now describe.

Figure 1:
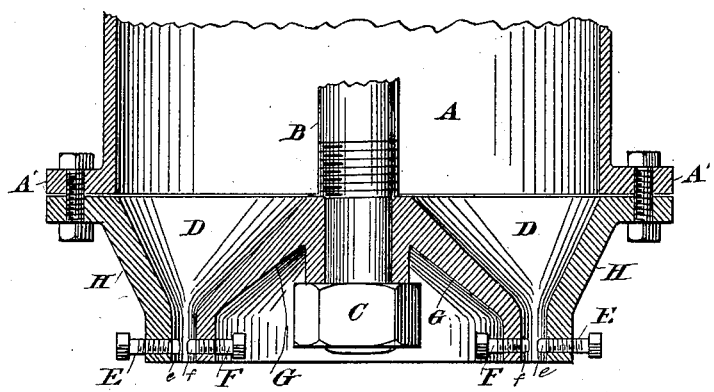
Figure 2:
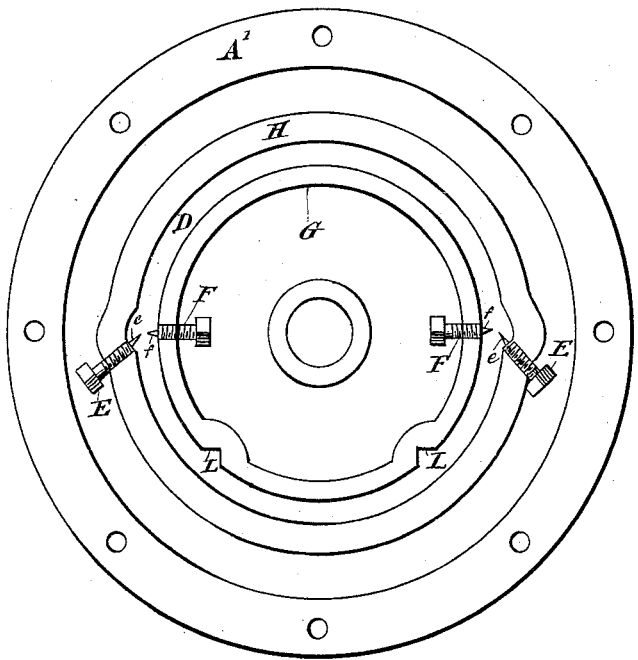
Figure 3:
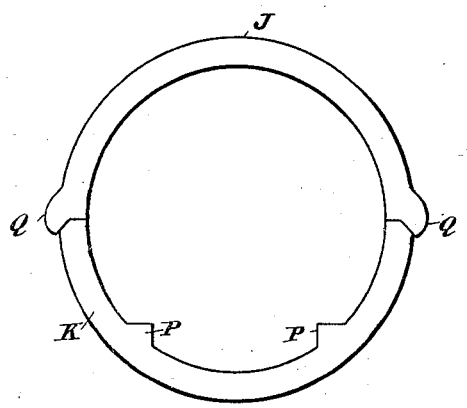
Figure 4:
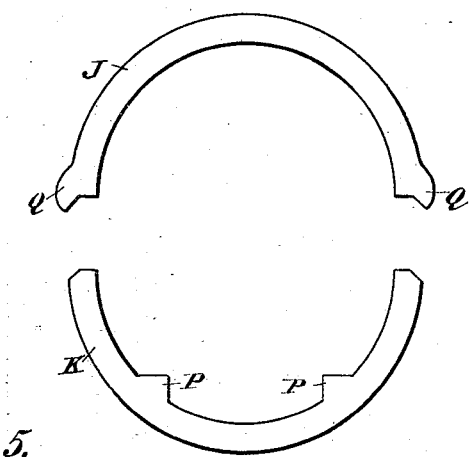
Figure 5:
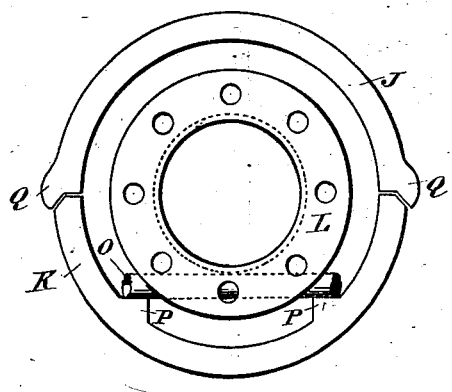

Such machinery or "die" is illustrated in Figures 1 and 2 on the first sheet of drawings submitted herewith. The clay pipe to be made by this die is shown in Figs. 3, 4, and 5 on the second sheet of drawings.

In the several figures the same parts as far as they reappear are denoted by the same letters.

To make the object of the machine clear, I begin with the figures of the second sheet, all of which give vertical sections of the clay pipe, which is supposed to lie horizontally, as it does, in the ground. Fig. 3 shows the pipe closed; Fig. 2, its two halves separate from each other; Fig. 5, the two halves nearly fitting each other, with the inclosed steam or water pipe within.

On the first sheet, Fig. 1 shows the die through which the clay is to be pressed and which is made up in the main of a vertical cylinder and cone in vertical cross-section—that is, in the plane dividing such cylinder and cone through a diameter—while Fig. 2 shows the die in circular section with a core which corresponds to the hollowness of the clay pipe.

Taking up the parts of the clay-pipe as shown in Figs. 3, 4, and 5 in detail, K in each of these figures is the lower segment, which has at P P two triangular knobs or protuberances. J is the upper segment. Q Q are the lips extending from the two ends of the upper segment, while the edges of the lower segment are cut down to fit these lips. In Fig. 5 a piece of gas-pipe or rod (marked O) is seen to rest on the knobs P P, while a steam-pipe L rests on this piece of gas-pipe or rod. The flange at the end of each section of steam-pipe, with bolt-holes for attaching it to the next section, is seen to the outside, while the narrow ring between the dotted and the black circle stands for the body of the steam-pipe. The clay pipes will not be more than two or three feet in length, and as the inclosed steam or water pipes are much longer and need a rest only at greater intervals only one in four or five of the clay pipes needs the knobs P P. The others may be made without them, the lower half having the same smooth cavity as the upper.

Having thus shown the kind of product which I expect from my die, I proceed to set forth its construction as shown in Figs. 1 and 2. Dies for pressing clay pipes are well known in the art, and those shown in these figures differ from those in common use only in details. The pressure is generally, though not always, applied vertically. In Fig. 1, A is a cylindrical cavity through which the clay comes down around a pillar B, which ends in the nut C, to a narrowing mold of which H H mark the outer walls and G G the inner walls. D D are the funnel-like cavity between the outer and lower walls of the mold. At the point where the cavity has narrowed to a mere ring of the thickness intended for the clay pipe to be produced the four screws E F F E are introduced, piercing the outer and inner walls of the mold, with the knives *e f f e* at their end, the blades whereof stand vertically and come pretty near to each other. In Fig. 2, A′ shows the widest part of the mold; H, the outer wall where it becomes narrowest; D, the open ring or hollowness between the outer and inner wall at the narrowest level; G, the inner wall at the same level. L L are corners cut out in the inner wall, shaped so as to bring out the knobs P P in the clay pipe. E F F E are the screws, and *e f f e* the knives, as in Fig. 1, shown here in their true position in the horizontal plane. They lie obliquely to each other, and, strictly speaking, the outer ones should have been foreshortened in Fig. 1, so as to give the right perspective, which would have been needlessly difficult, and the two drawings together show the position of these screws and knives sufficiently.

The letter B is not repeated in Fig. 2, as the pillar thus marked does not come down to the level in that figure; but there is a double circle to identify its place.

There will be another mold for pressing those clay pipes which have no knobs P P. It is needless to make a separate drawing, as such mold will simply lack the indentations and bends (marked L L) and have the same outlines for the lower as for the upper segment of the pipe.

From an inspection of Fig. 2 it appears that the walls of the mold or die are of such an outline as to give shape to the lips on the two sides of the clay pipe and that the knife-edges standing vertically from a part of the mold and on both sides leave such a thin layer of clay connecting the two segments that by a few slight taps with a hammer they can be separated without injury to either part. These taps will be applied after the pipe is baked. While being baked it must be kept in good cylindrical form by being in one piece.

Having declared already that molds for the pressing of clay pipes of the general character shown above are well known in the art, I confine my claims as an inventor to such a modification of the mold or die as will produce my improved clay pipe, and now say that.

What I claim as my invention, and desire to protect by Letters Patent, is—

1. A die for forming clay pipes, consisting of an inner and an outer ring spaced apart, recesses in the inside of the outer ring, knife-blades in the inner ring opposite to said recesses, and knife-blades in the outer ring located in said recesses and set obliquely to the inner knife-blades with a narrow space between the ends of the said inner and outer knife-blades.

2. A die for forming clay pipes consisting of an inner and outer ring spaced apart, having two square recesses in the outside of the inner ring, recesses in the inside of the outer ring, knife-blades in the inner ring opposite to said last-mentioned recesses, and knife-blades in the outer ring located in said recesses and set obliquely to the inner knife-blades with a narrow space between the ends of the said inner and outer knife-blades.

MARTIN J. BANNON.

Witnesses:
   A. L. DEMBITZ,
   SOPHIA KURN.